US007748099B2

(12) United States Patent  (10) Patent No.: US 7,748,099 B2
Roush  (45) Date of Patent: Jul. 6, 2010

(54) METHOD FOR CREATING CARGO CONTAINER WITH U-SHAPED PANELS

(75) Inventor: Mark A Roush, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 7 days.

(21) Appl. No.: 12/174,872

(22) Filed: Jul. 17, 2008

(65) Prior Publication Data
US 2009/0021047 A1 Jan. 22, 2009

Related U.S. Application Data

(60) Provisional application No. 60/961,165, filed on Jul. 19, 2007.

(51) Int. Cl.
*B23P 17/00* (2006.01)
*B21D 53/88* (2006.01)
*B62D 33/04* (2006.01)

(52) U.S. Cl. ............. 29/422; 29/897.2; 296/181.3

(58) Field of Classification Search ............. 29/422, 29/428, 897, 897.2, 425, 450; 296/181.3, 296/193.03, 186.1, 168; 220/675, 1.5; 264/241
See application file for complete search history.

(56) References Cited

U.S. PATENT DOCUMENTS

| | | | |
|---|---|---|---|
| 2,871,911 A | 2/1959 | Brandt | |
| 2,934,372 A | 4/1960 | Jewell | |
| 2,990,091 A | 6/1961 | Brandt | |
| 3,163,435 A * | 12/1964 | Krueger et al. | 280/832 |
| 3,556,888 A | 1/1971 | Goldsworthy | |
| 3,557,992 A | 1/1971 | Reeves | |
| 4,094,430 A | 6/1978 | Cauley | |
| 4,214,669 A | 7/1980 | McQuiston | |
| 4,420,359 A | 12/1983 | Goldsworthy | |
| 5,026,447 A | 6/1991 | O'Connor | |
| 5,041,318 A | 8/1991 | Hulls | |
| 5,225,020 A | 7/1993 | Millett | |
| 5,286,320 A | 2/1994 | McGrath | |
| 5,289,933 A | 3/1994 | Streich | |
| 5,472,290 A | 12/1995 | Hulls | |
| 5,556,496 A | 9/1996 | Sumerak | |
| 5,690,378 A | 11/1997 | Romesburg | |
| 5,730,485 A | 3/1998 | Sjostedt | |
| 5,882,460 A | 3/1999 | Durand | |

(Continued)

*Primary Examiner*—John C Hong
(74) *Attorney, Agent, or Firm*—Dowell Baker, P.C.

(57) ABSTRACT

A cargo container that includes a U-shaped panel, and/or an L-shaped panel is disclosed. The cargo container has a top, bottom, and two sides, each U-shaped and/or L-shaped panels forms part of the top and a side, or the bottom and a side. The cargo container may further include doors with hinges and/or doors that slide. Landing gear may support the container when not in transit. The U-shaped and/or L-shaped panels may be inhomogeneous in size and thickness to reinforce the areas of highest stress concentration such as the container edges or the attachment location of the landing gear. The cargo container may also have a bottom floor with a greater thickness than each of the significantly parallel sides, or a bottom floor with parallel or interconnected support protrusions. The U-shaped and/or L-shaped panels may include internal support structures. Also disclosed is a method of manufacturing U-shaped and/or L-shaped panels.

21 Claims, 18 Drawing Sheets

U.S. PATENT DOCUMENTS

| | | |
|---|---|---|
| 5,918,759 A | 7/1999 | Beckmann |
| 5,928,735 A | 7/1999 | Padmanabhan |
| 5,948,472 A | 9/1999 | Lawrie |
| 6,092,472 A * | 7/2000 | Thoman et al. ............. 105/404 |
| 6,095,715 A | 8/2000 | Hulls |
| 6,158,773 A | 12/2000 | Verhaeghe |
| 6,183,824 B1 | 2/2001 | Padmanabhan |
| 6,345,949 B1 * | 2/2002 | Floor et al. ................. 414/528 |
| 6,558,608 B2 | 5/2003 | Haraldsson |
| 6,565,976 B1 | 5/2003 | Qureshi |
| 6,871,600 B2 | 3/2005 | Norton |
| 7,000,978 B1 | 2/2006 | Messano |
| 7,028,382 B2 | 4/2006 | Fisher |
| 7,056,976 B2 | 6/2006 | Joshi |
| 7,390,052 B2 * | 6/2008 | Bertoch et al. .............. 296/168 |
| 7,401,844 B2 | 7/2008 | Lemmons |
| 2002/0014302 A1 | 2/2002 | Fanucci |
| 2002/0148382 A1 | 10/2002 | Norton |
| 2006/0070340 A1 | 4/2006 | Fanucci |
| 2007/0023438 A1 | 2/2007 | Kenneth |

\* cited by examiner

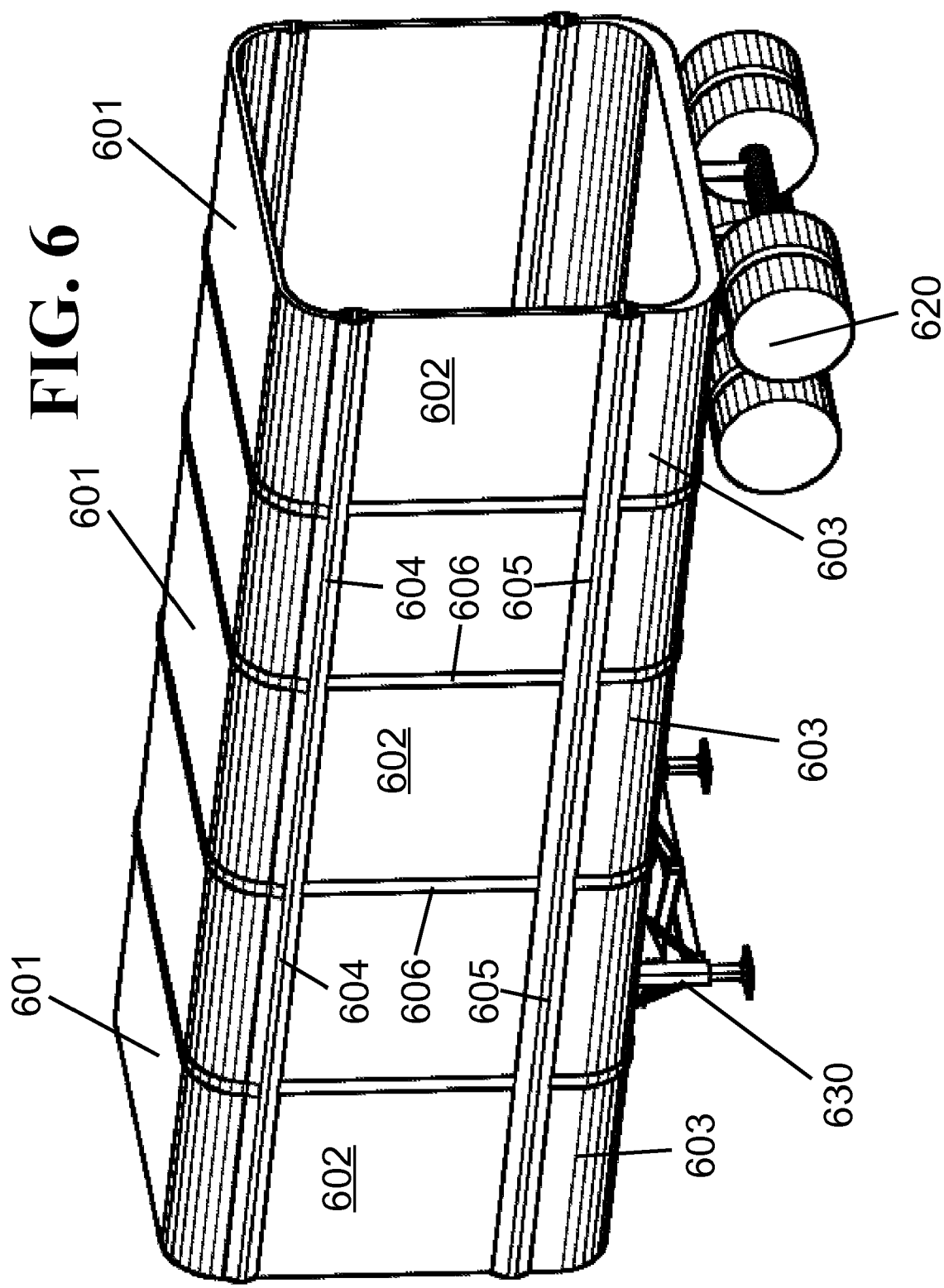

FIG. 9
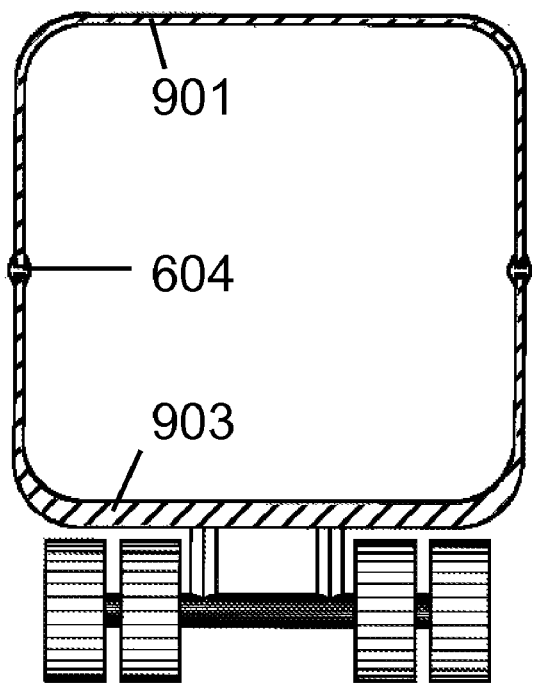
FIG. 10
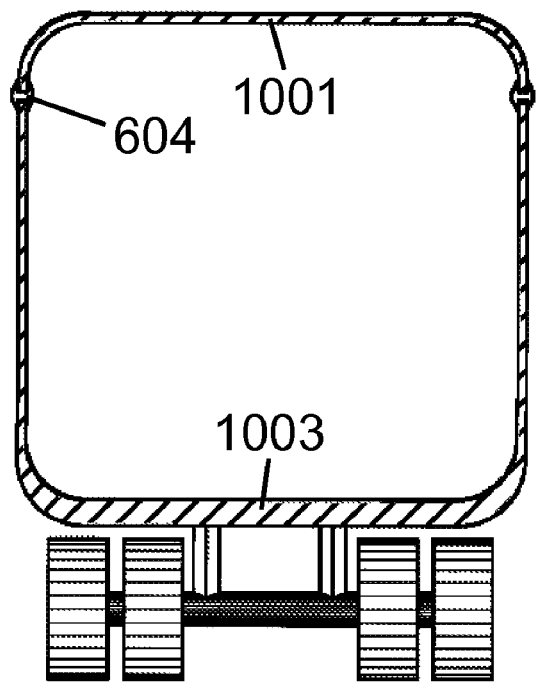
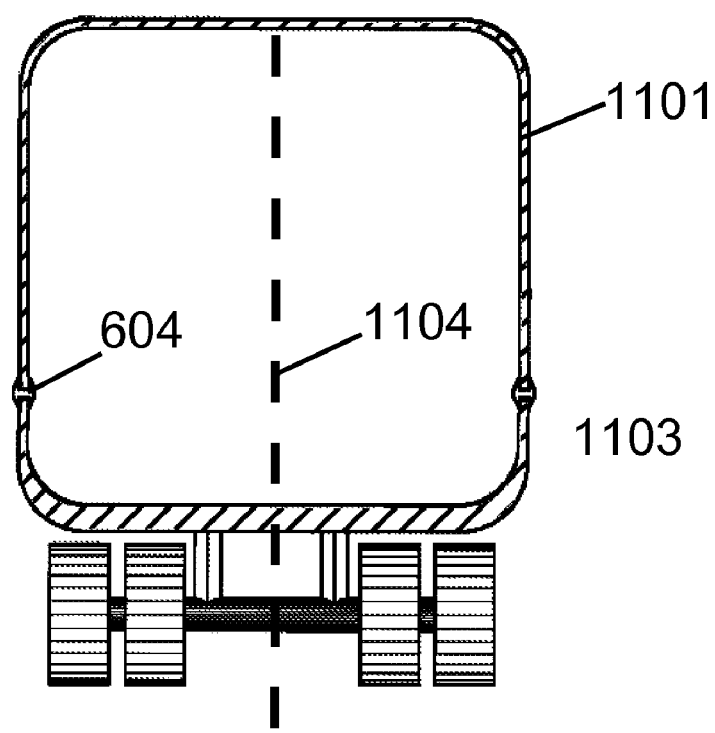
FIG. 11

METHOD FOR CREATING CARGO CONTAINER WITH U-SHAPED PANELS

CROSS-REFERENCE TO RELATED APPLICATION

This application claims priority to provisional application Ser. No. 60/961,165, entitled "Cargo Container with U-shaped Panels" filed Jul. 19, 2007 to Mark Roush, the contents of which are herein incorporated by reference.

FIELD OF THE INVENTION

This invention relates to cargo containers. More specifically, it relates to cargo containers that include U-shaped and/or L-shaped panels.

BACKGROUND OF THE INVENTION

Cargo containers are well known, and are typically transported by ships, trains, and trucks. Containers may also be transported by air, and certain containers have been specially shaped to fit into the curved hulls of airplanes. In most instances it is desirable to reduce the weight of the cargo container to conserve fuel and, in some applications, increase the weight of the cargo that may be carried. For example, Federal Truck Size and Weight limitations restrict gross vehicle weight to less than 80,000 pounds on the U.S. Interstate system. If the weight of the container can be decreased, the maximum transportable cargo weight is increased. Thus, it is desirable to have a cargo container with a minimal weight so that cargo weight can be maximized.

The use of polymer materials in lieu of metal components in container construction can reduce the total weight of the container. However, polymers may fracture when a force is exerted upon the material. Fractures in polymers cannot usually be repaired as easily as dents in metal, and complete replacement of the fractured polymer is often required. Thus, it is desirable to minimize the size of complete polymer sections so that, if replacement becomes necessary, the amount of material being replaced is minimized when repair is required.

The complexity of panel joints often results in structural weakness due to a greater likelihood of a defective or improperly assembled portion. In contrast, panel fabrication is commonly a simpler, more automated process producing a product of more consistent quality. Joints that utilize multiple materials, such as bolts and clips, are further subjected to increased corrosion, uneven wear, and uneven thermal expansion and contraction. Also, since joints are typically at the very ends of panels, forces acting upon a jointed panel will commonly exert the greatest torque at the joint.

Cargo container joints often require significant reinforcement so that the joint can withstand the compressive and tension load exerted upon them. Joint reinforcement increases the total weight of the container, often reducing the amount of cargo that can be legally carried. The size of the joint reinforcements may even reduce the total cargo volume carryable. Cargo containers with rounded edges have the advantage of providing a substantially continuous load path where the force of the load is substantially spread between the vertical and horizontal portions of the container. Even if the amount of cargo is not limited by the reinforcements, the additional weight will often increase the cost of transporting the container.

Cargo containers and panels wear out with time and must eventually be replaced, thus it is desirable to have a cargo container that is easily manufactured with small replaceable panels. Additionally, expensive machinery is often required to produce large polymer panels while smaller pieces can be produced by smaller, cheaper, machinery. Also, the use of a segmented cargo container allows for the parallel production of several components at once.

There are many problems associated with cargo container joints, joint reinforcement, container construction, and the forces exerted upon the edges of cargo containers. Thus, it is desirable to have a cargo container with rounded edges made from a plurality of panels where the panel joints and rounded edges of the container are spatially separated.

There have been attempts to solve these problems, however none have yielded a solution capable of solving all of the disclosed problems. For example, U.S. Pat. No. 5,289,933 that issued to Streich et al. discloses a collapsible cargo container that is jointed together in the corner regions of the container. The '933 patent fails to disclose the use of highly curved panels capable of distributing torsional forces over a large area of the joint.

U.S. Pat. No. 4,214,669 that issued to McQuiston discloses a collapsible cargo container with joints that are not located at the edges of the container. As with the '933 patent, the '669 patent fails to disclose rounded edges, and shows reinforced corners.

U.S. Pat. No. 5,690,378 issued to Romesburg discloses a monocoque cargo container that with a top and bottom piece jointed together. The '378 patent, however, fails to disclose the use of many separate panels in the construction of the cargo container. Such a design is not easily manufacturable or repairable due to the use of very large component pieces.

U.S. Pat. Nos. 5,041,318, 5,472,290, and 6,095,715 that issued to Hulls disclosed the use of joints between the top and side of a cargo container that provide "a substantially continuous load path." The Hulls patents disclose the advantages of a cargo container with curved edges, but fail to disclose a joint that is distant from the cargo container edges. The Hulls patents also do not disclose the use of multiple individual panels that can be easily manufactured or replaced when damaged.

SUMMARY OF THE INVENTION

In accordance with preferred embodiments of the present invention, many of the problems associated with cargo containers are overcome. A light weight cargo container with U-shaped and/or L-shaped panels is presented.

The cargo container includes a top roof, a bottom floor, and two significantly parallel sides. The cargo container includes U-shaped panels, and/or L-shaped panels, that form part of the top roof and parallel sides, or the bottom floor and parallel sides. The cargo container may further include doors with hinges and/or doors that slide. Landing gear may support the container when the container is not in transit. The U-shaped, and/or L-shaped panels may be non-uniform in size and thickness to reinforce the areas of highest stress concentration. The cargo container may further include a bottom floor with greater thickness than each of the significantly parallel sides, or a bottom floor with parallel or interconnected support features. The U-shaped, and/or L-shaped panels may include internal support structures. Also presented is a method of manufacturing U-shaped and/or L-shaped panels.

The foregoing and other features and advantages of the preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 6 is a perspective view of a cargo container that comprises a plurality of U-shaped panels, a wheel assembly, and landing gear;

FIG. 9 is a rear sectional view of a cargo container that comprises a plurality of U-shaped panels, joint connectors, and a wheel assembly;

FIG. 10 is a rear sectional view of a cargo container that comprises a top U-shaped panel, joint connectors, a wheel assembly, and a bottom U-shaped panel that significantly defines the sides of the cargo container;

FIG. 11 is a rear sectional view of a cargo container that comprises a bottom U-shaped panel, joint connectors, a wheel assembly, and a top U-shaped panel that significantly defines the sides of the cargo container;

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to the figures.

Exemplary Panel Manufacturing Machine

Figure 1:
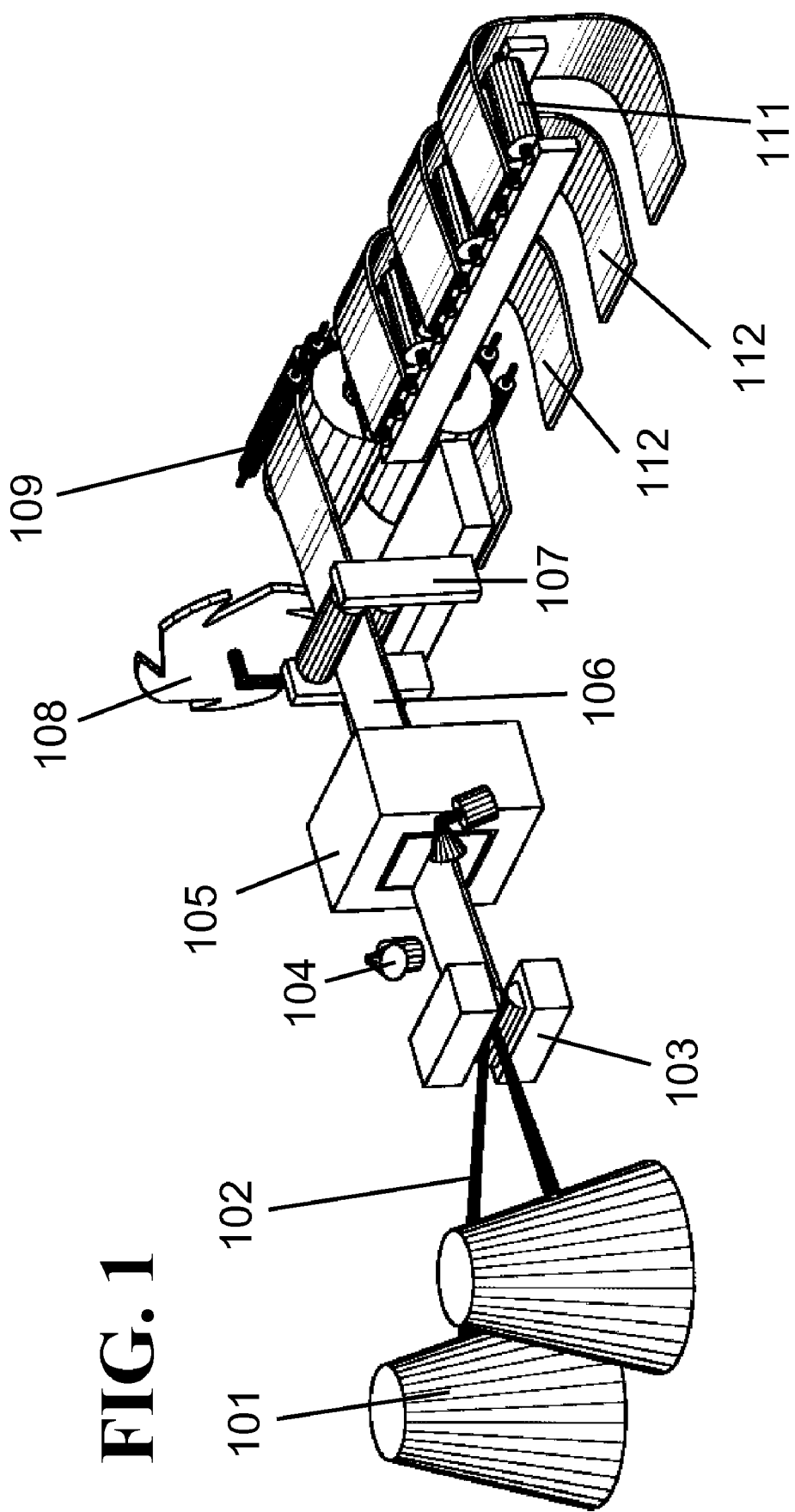
FIG. 1 is a schematic view of machinery continuously manufacturing U-shaped panels where not all the panel material passes through a final forming means.
Figure 2:
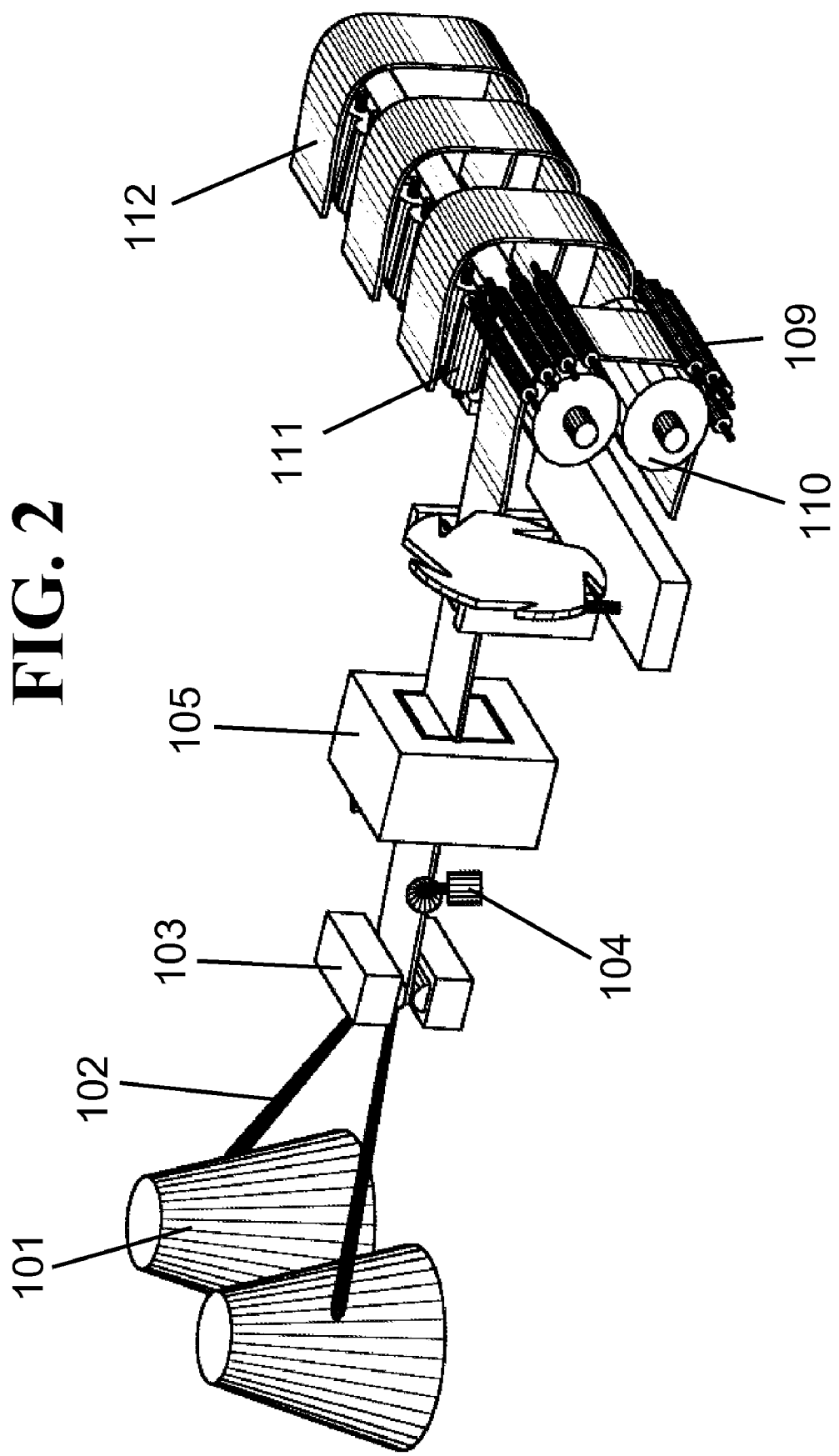
FIG. 2 is a second schematic view of machinery continuously manufacturing U-shaped panels where not all the panel material passes through a final forming means.

FIGS. 1 and 2 illustrate an exemplary embodiment of machinery continuously manufacturing U-shaped panels. Fiber material 102 drawn from a fibrous material source 101 is fed into a pre-forming device 103 that creates a fiber sheet of substantially parallel fibers. Resin applicators 104 apply resin to the fiber sheet creating a resin impregnated sheet where substantially all of the fibers are oriented parallel to each other. Computer controlled heated and cooled forming guides 105, further shape the resin impregnated fiber sheet 106. The sheet is drawn through a pulling means 107, and passed through a U-shaped shaping means with an outer forming means 109 and an inner forming means 110. At predetermined intervals, a cutting means 108 segments the U-shaped sheets into U-shaped panels 112 with fibers that are locally oriented substantially parallel to each other despite macro-scale changes in orientation due to the U-shape curvature of the panel. The panels are transported away from the machinery by a moving means 111. In another embodiment of the invention, L-shaped panels are formed by cutting the sheets before a second bend is put into the panels.

Figure 3:
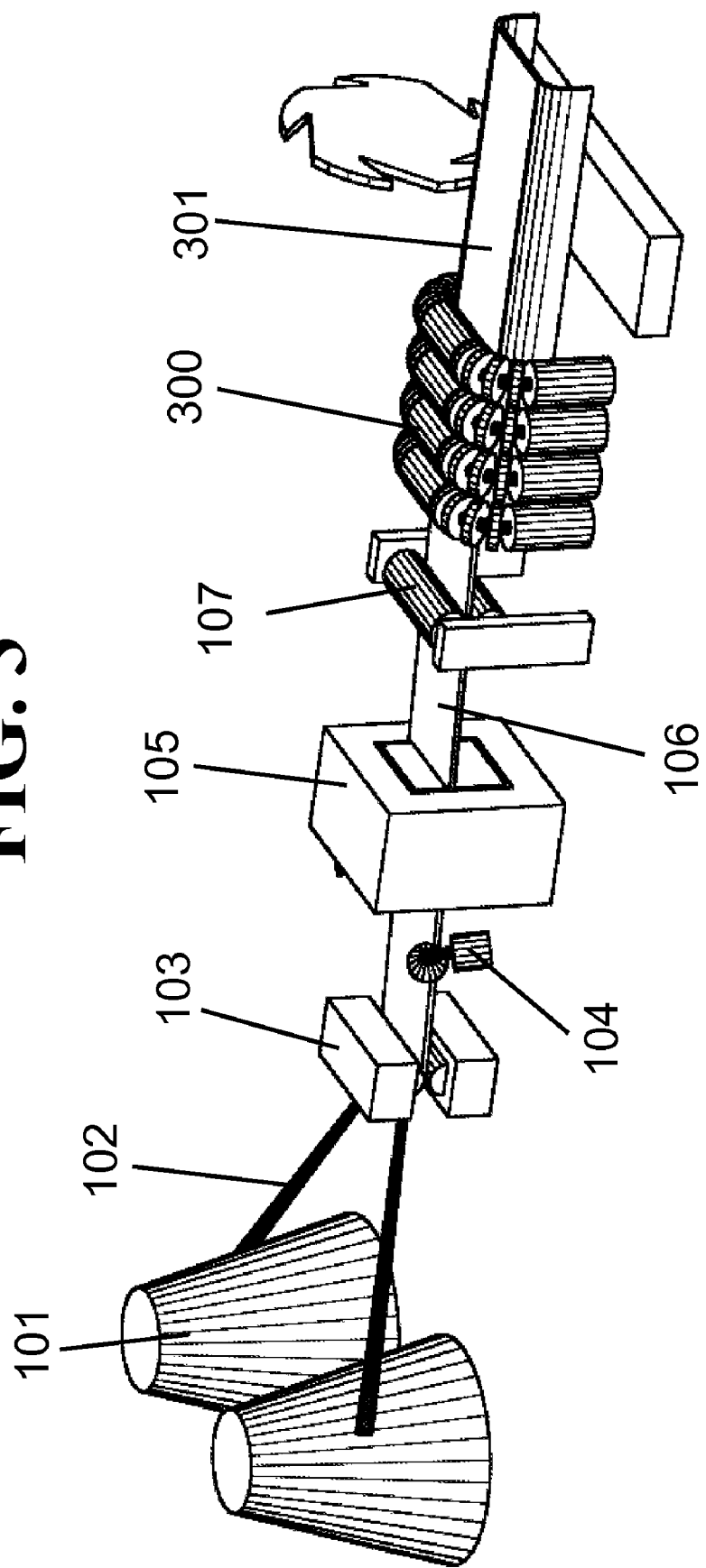
FIG. 3 is a schematic view of machinery continuously manufacturing U-shaped panels where all the panel material passes through a final forming means.

FIG. 3, illustrates a second exemplary embodiment of machinery continuously manufacturing U-shaped panels. Fiber material 102 drawn from a fibrous material source 101 is fed into a pre-forming device 103 that creates a sheet of substantially parallel fibers. Resin applicators 104 apply resin to the fiber sheet creating a resin impregnated sheet. Computer controlled heated and cooled forming guides 105 further shape the resin impregnated fiber sheet 106. The sheet is drawn through a pulling means 107, and passed through a U-shaped shaping means 300. The U-shaped sheet 301 is cut by a cutting means at predetermined intervals to create U-shaped panels. In this embodiment of the invention, the fibers are oriented parallel to each other on both the micro and macro scale since the fibers extend perpendicular to the U-shaped curvature. In another embodiment of the invention, the U-shaped shaping means is replaced by an L-shaped shaping means.

Exemplary Panel Method of Manufacture

Figure 4:
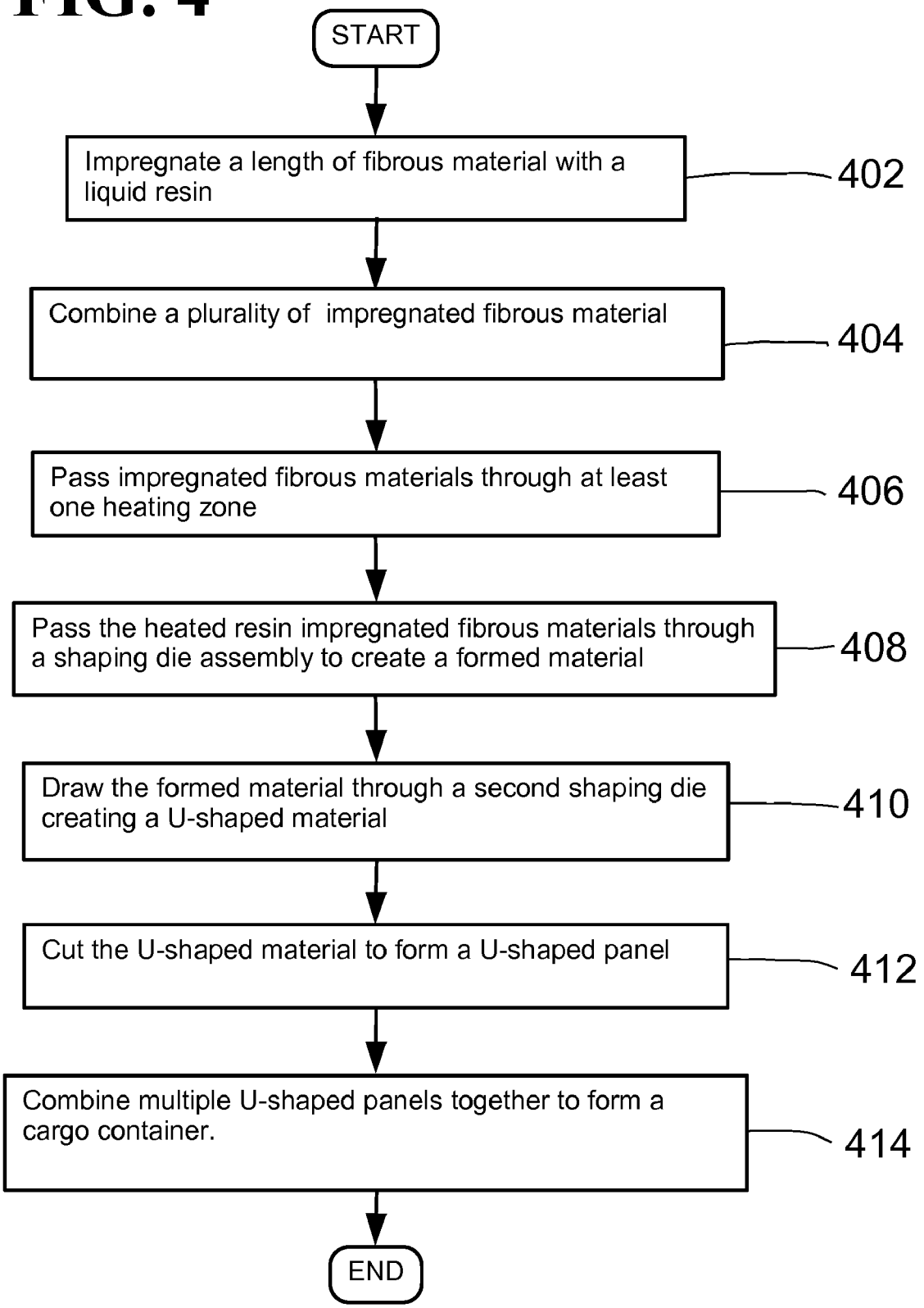
FIG. 4 is a flow diagram illustrating a method for creating U-shaped panels and a cargo container including the panels.

FIG. 4 is a flow diagram illustrating a method for creating a U-shaped panel from a pultrusion process. At Step 402 a length of fibrous material is impregnated with a resin. At Step

404 the impregnated fibrous material is combined with other impregnated fibrous materials. At Step 406 the resin impregnated fibrous materials are passed through at least one heating zone. At Step 408, the heated resin impregnated fibrous materials are passed through a shaping die assembly to create a formed material. At Step 410, the formed material is drawn through a second shaping die creating a U-shaped material. At Step 412, the U-shaped material is cut to create a manufactured U-shaped panel. At Step 414, multiple U-shaped panels are connected to create a cargo container.

The method illustrated is an exemplary embodiment. However, the present invention is not limited to such an embodiment and other embodiments can also be used to practice this invention.

In such an exemplary embodiment, at step 402 a length of fibrous material is impregnated with a resin. Examples of fibrous materials include injected molded glass, fiberglass, Nylon™, glass material, stamped steel, stamped aluminum, carbon/Nylon™ reinforced textile sheets, amarid, polyester, and carbon fiber.

Examples of resins include epoxy, unsaturated polyester, urethane acrylate, vinyl ester, phenol, polyurethane, a thermoplastic resin (such as nylon 6, nylon 66, nylon 12), PBT, PET, polycarbonate, polyacetal, polyphenylene sulfide, polyether ether ketone, polyether sulfide, polyphenylene oxide, modified polyphenylene oxide, polypropylene, polyvinyl chloride, ethylene-vinyl acetate copolymer; polystyrene, acrylonitrile-butadiene-styrene copolymers (ABS), 6, 11, 12, 6-6 and 6-10 polyamides, poly(ether amide) sequenced copolymer, fluorinated polymers, polysulfone, polyethersulfone, polycarbonate, polyetheretherketone, polyphenylene sulfur, polyetherimide, and polyphenylene ether.

At step 404 resin impregnated fibrous material is combined with other impregnated fibrous materials in a process that may include passing the resin impregnated material through a die to compress them, thus forcing the molten resin to penetrate between the fibers.

At step 406 the resin impregnated fibrous materials are passed through at least one heating zone. Examples of heating zones include a heated tunnel, a heated die, and a heated solution bath. At Step 408, the heated resin impregnated fibrous materials are passed through a shaping die assembly to create a formed material. In one exemplary embodiment of the invention, the shaping die includes both a heating means and a cooling means. At Step 410, the formed material is passed through a second shaping die forming a material in the general shape of a U-shaped panel. At Step 412, the material is cut to form a U-shaped panel. At Step 414, multiple U-shaped panels are connected together to form a cargo container. Doors, hinges, a landing gear assembly that supports the front of the container during parking and storage, a king pin, and a wheel assembly are optionally connected to the cargo container. Post manufacture modifications to the cargo container may further include connecting additional structural supports, smoothing the outer surfaces, rounding off of one or both ends, connecting doors, and creating structural gaps in the floor, roof, and sides of the cargo container. Structural supports may be inserted into any structural gaps created.

Figure 5:
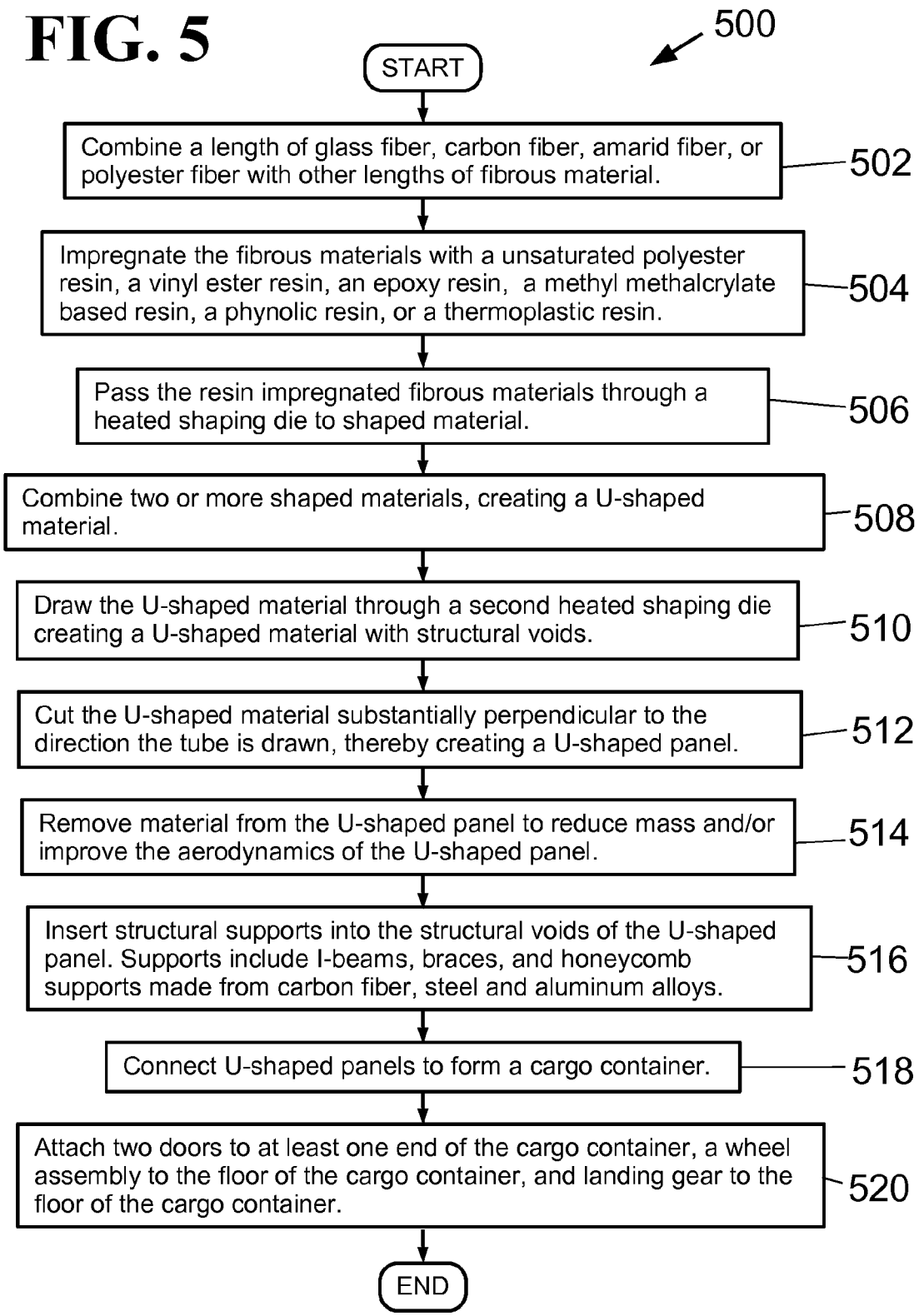
FIG. 5 is a flow diagram illustrating a method for creating U-shaped panels and a cargo container using exemplary embodiments of fiber, resin, and structural supports.

In another exemplary embodiment, FIG. 5 illustrates a Method 500 for creating a cargo container. At Step 502, a length of glass, carbon, amarid, or polyester fiber material is combined with other lengths of fibrous material. At Step 504, the fibrous materials are impregnated with an unsaturated polyester, a vinyl ester, an epoxy, a methyl methalcrylate based, a phynolic, or a thermoplastic resin. At Step 506, the resin impregnated fibrous materials are passed through a heated shaping die to create a shaped material. At Step 508, two or more shaped materials are combined creating a U-shaped material. At Step 510, the U-shaped material is drawn through a second heated shaping die creating a U-shaped material with structural voids. At Step 512, the U-shaped material is cut substantially perpendicular to the direction the material is drawn, thereby creating a panel. At Step 514, material is removed from the panel to reduce mass and/or improve aerodynamics. At Step 516, structural supports are inserted into the structural voids of the U-shaped panel. Structural supports include I-beams, braces, and honeycomb supports made from carbon fiber, steel and/or aluminum alloys. At Step 518, multiple panels are connected forming a cargo container. At Step 520, two door assemblies are connected to at least one end of the cargo container, a wheel assembly is attached to the floor of the cargo container, and trailer landing gear assembly is connected to the floor of the cargo container. Post manufacture modifications to the cargo container may further include adding additional structural supports, smoothing the outer surfaces, rounding off of one or both ends, connecting additional doors, and creating structural gaps in the floor, roof, and sides of the cargo container. Structural supports may be inserted into any structural gaps created.

Other machinery and methods for producing U-shaped and L-shaped panels may be utilized and are within the scope of the invention. For example, standard flat panels commonly used in cargo container construction may be bent into a U-shape or an L-shape. The materials that may be used in construction of the panels include, but are not limited to, polymers, metals such as aluminum and steel, stone and other minerals, wood, carbon fiber, and reinforced fabrics. Other materials and methods of manufacture will be obvious to those of reasonable skill in the art and are within the scope of the invention.

FIG. 6, illustrates a cargo container comprising an interior storage space defined by a plurality of top U-shaped panels 601, side panels 602, bottom U-shaped panels 602, a top horizontal connection 604, a bottom horizontal connector 605, and a plurality of vertical connectors 606. The cargo container also has a wheel assembly 620 and landing gear 630 connected to the bottom U-shaped panels. The U-shaped panels have vertical sidewalls located at the side of the trailer and horizontal sections forming either the roof or floor of the trailer. Connecting the vertical sidewalls to the horizontal sections are curved sections with the U-shaped panel. The horizontal connectors connect the U-shaped panels and the side panels. The vertical connectors are similarly shaped so as to provide a substantially watertight seal. In one embodiment of the invention, the cargo container has a length of 43 to 63 feet, a width of 95 to 107 inches, and a height of 100 to 120 inches (not including landing gear and the wheel assembly). In another embodiment of the invention, the U-shaped panels have a width (parallel to the wheel axis) of 90 to 107 inches that is substantially similar to the width of the wheel assembly. In an exemplary embodiment of the invention, the cargo container has a length of 53 feet, a width of 102 and 5/16ths inches, and a height of 110 inches (not including landing gear and the wheel assembly). In an exemplary embodiment of the invention, the cargo container has a height of 13 feet 6 inches (including landing gear and the wheel assembly), a width of between 98 and 105 inches, and a length of between 43 and 63 feet.

Figure 25:
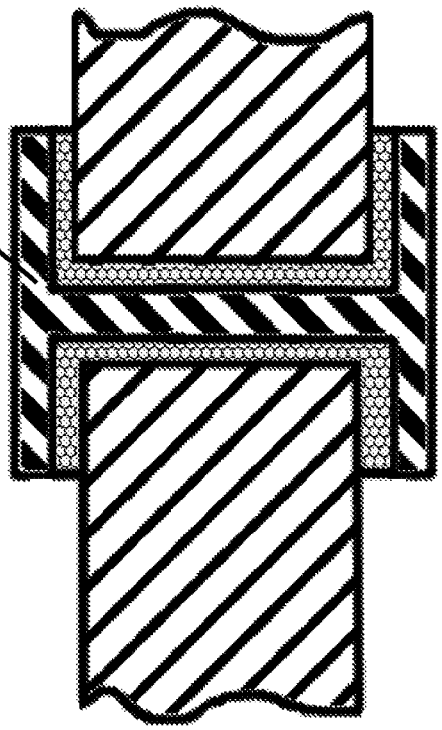
FIG. 25 is a partial sectional view of two panels connected with an H-shaped connector by an adhesive.
Figure 26:
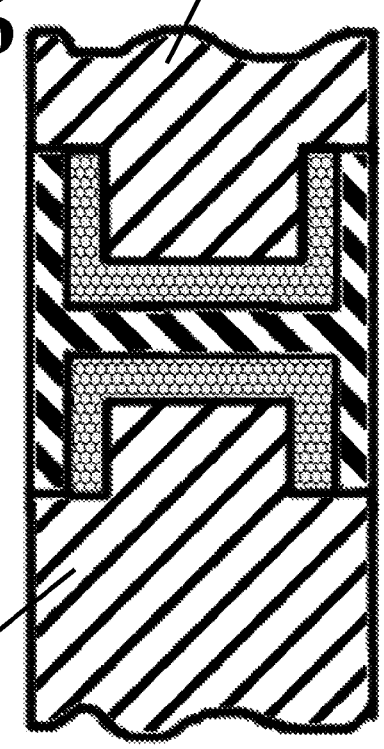
FIG. 26 is a partial sectional view of two panels with routed edges connected with an H-shaped connector by an adhesive.

U.S. Provisional Patent Application 60/930,926 titled "Cargo Tube" filed May 18, 2007 and U.S. Utility application Ser. No. 12/121,994 titled "Cargo Tube" filed May 16, 2008 by Mark Roush of Lafayette, Ind. are hereby incorporated by reference. The cargo container constructed from U-shaped panels may further include features disclosed in the '926 and '994 applications. For example, the cargo container constructed from U-shaped panels may have cross hatched structural supports as shown in FIG. 11 of provisional "Cargo Tube," or the cargo container may have a rounded rear section as shown in FIG. 25 of provisional "Cargo Tube."

Figure 8:
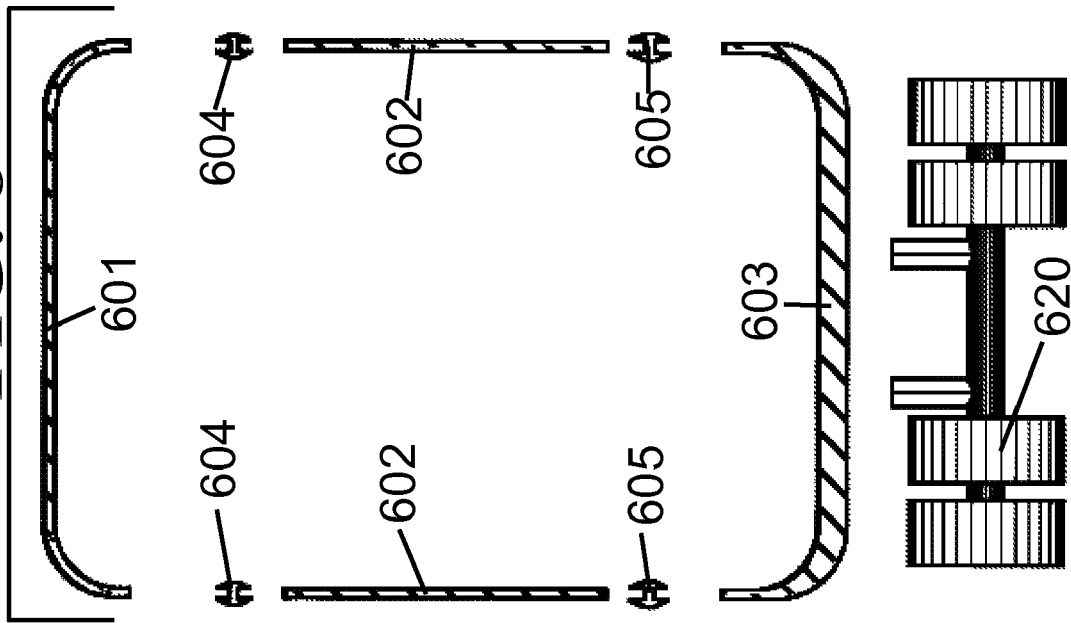
FIG. 8 is an exploded rear sectional view of a cargo container that comprises a plurality of U-shaped panels, joint connectors, flat side panels, and a wheel assembly.
Figure 7:
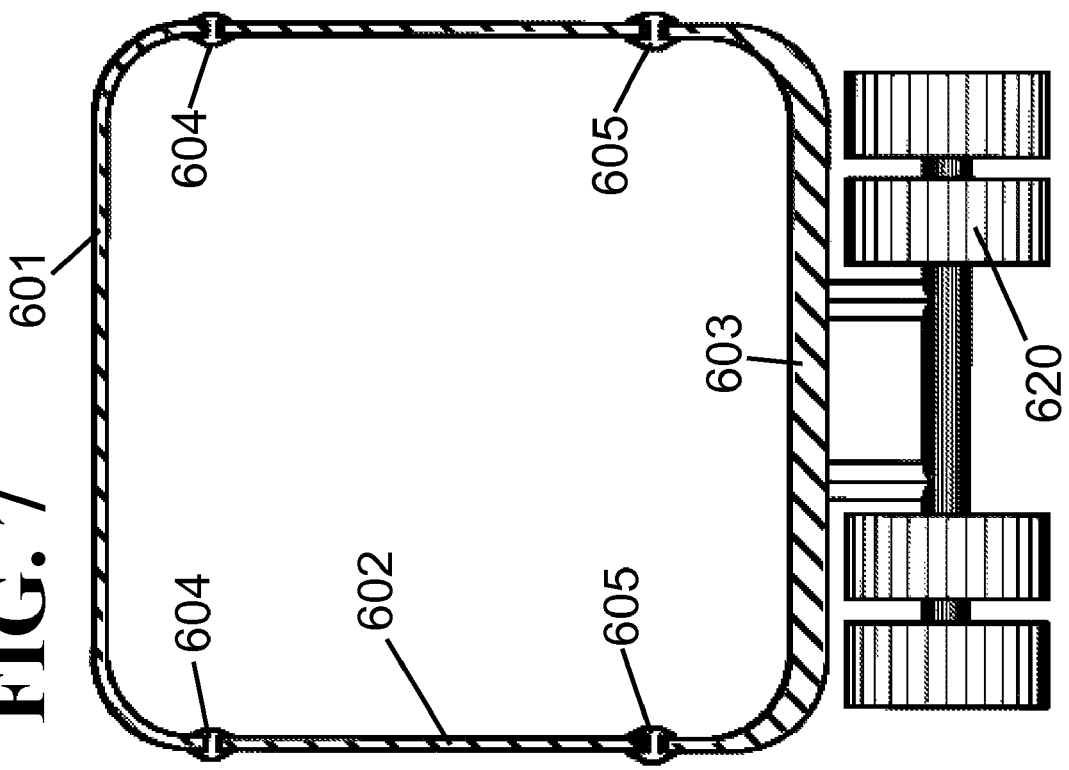
FIG. 7 is a rear sectional view of a cargo container that comprises a plurality of U-shaped panels, joint connectors, flat side panels, and a wheel assembly.

FIGS. 7 and 8 illustrate condensed and exploded rear sectional views of a cargo container comprising a top U-shaped panel 601, two side panels 602, and a bottom U-shaped panel 603. The top and bottom U-shaped panels are connected to the side panels 602 by top connectors 604 and bottom connectors 605, respectively. The bottom U-shaped panel has a greater thickness than the top U-shaped panel to support a load carried within the container. Additionally, in the top U-shaped panel, the network of parallel resin impregnated fibers extends uninterrupted from one top connector 604, across the width of the panel, to the distant top connector on the other side of the trailer. Similarly, in the bottom U-shaped panel, the network of parallel resin impregnated fibers extends uninterrupted from one bottom connector 605, across the width of the panel, to the distant bottom connector on the other side of the trailer.

FIGS. 9, 10, and 11 illustrate rear sectional views of cargo containers with connected upper and lower U-shaped panels. In FIGS. 9, 10, and 11 both the top U-shaped panel has sidewalls that are adjacent to the sidewalls of the bottom U-shaped panel. Specifically, FIG. 9 shows a cargo container where the top U-shaped panel 901 and bottom U-shaped panel 903 are similar in dimensions. Such a design would maximize the distance between the edges of the container and the joints. Additionally, similarly dimensioned top and bottom U-shaped panels would facilitate manufacture since fewer modifications to the panel making machinery would be required to change between similarly shaped panels. FIG. 10 shows a cargo container with a bottom U-shaped panel 1003 with sidewalls that are significantly taller than the sidewalls of the top U-shaped panel 1001. The heights of the bottom sidewalls are substantially similar to the total height of the interior space since the sidewalls of the top U-shaped panel are quite short. The forces exerted upon the bottom edges are likely to be significantly greater than the forces exerted upon the top edges.

FIG. 11 illustrates an embodiment of the invention with two U-shaped panels where the top panel 1101 has sidewalls that are similar in height to the total interior cargo space. Since the top sidewalls are tall, the sidewalls of the bottom U-shaped panel 1103 are short. Such a design is advantageous in that removal of the top U-shaped panel creates a cargo container that is substantially similar to a flat bed trailer. FIG. 11 also illustrates a geometric plane 1104 about which both the top and bottom U-shaped panel are symmetrical. The geometric plane is substantially vertical, extends the length of the trailer, and intercepts a middle of the landing gear assembly, wheel assembly, and a kingpin of the trailer. Since the resin impregnated fibers are substantially parallel, the U-shaped panels may be substantially symmetrical about the geometric plane on a micro (individual fibers) and macro scale (general curvature of the panel).

Figure 12:
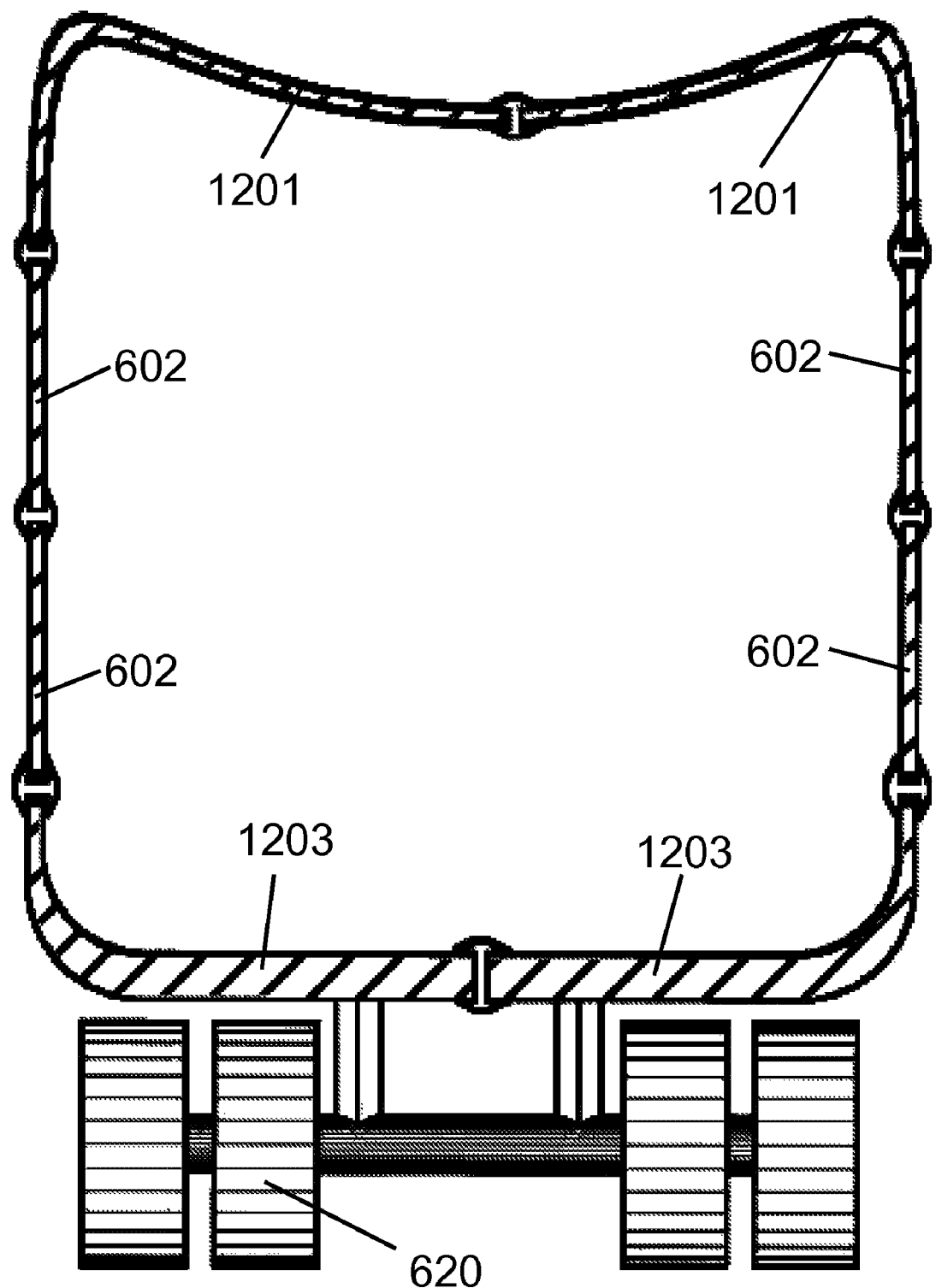
FIG. 12 is a rear sectional view of a cargo container that comprises two top L-shaped panels, two bottom L-shaped panels, joint connectors, and a wheel assembly.

FIG. 12, illustrates a rear cross section of a cargo container comprising a plurality of L-shaped top panels 1201, a plurality of flat side panels 602, and a plurality of L-shaped bottom panels 1203. The L-shaped panels are connected to other panels by connectors. In FIG. 12, the top L-shaped panels form a non-planar cargo container roof. Such a design may be beneficial in reducing wind resistance on the container, and/or reducing mechanical stress. L-shaped panels are smaller in size than U-shaped panels thereby facilitating manufacture and replacement when necessary.

Figure 13:
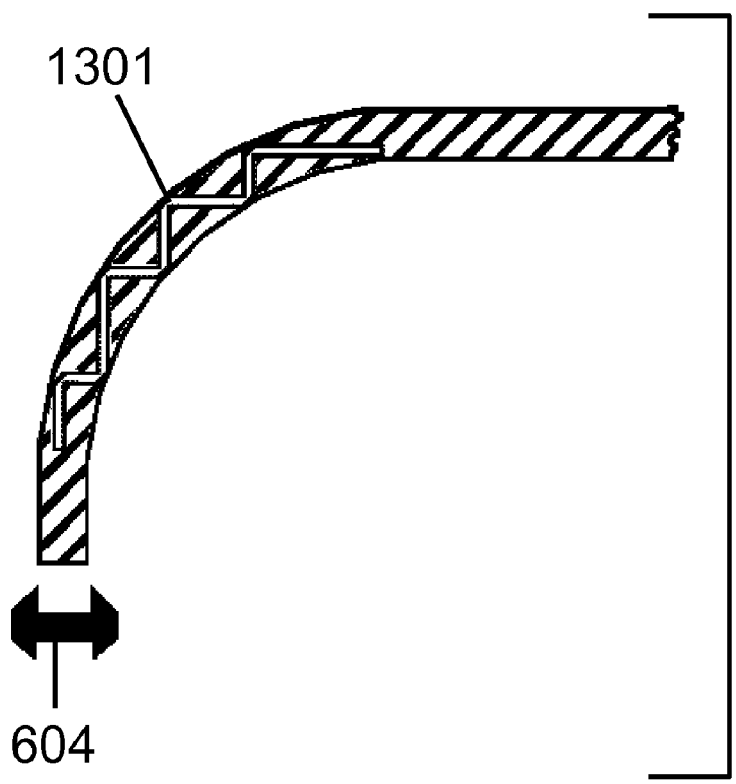
FIG. 13 is a partial rear sectional view of a cargo container, where a structural support is integrally formed into part of a U-shaped panel.

FIG. 13 illustrates a partial sectional rear view of a U-shaped panel with structural supports. An integral structural support 1301 reinforces the curvature of the U-shaped panel without changing its dimensions. Although there are structural supports in the U-shaped panel, the structural network/lattice of resin and fibers extends uninterrupted from the horizontal section of the panel, through the curved section of the panel, to the vertical sidewall of the U-shaped panel. Despite a structural support, a continuous unbroken path of fiber impregnated resin extends from the horizontal section to the vertical sidewall.

Figure 14:
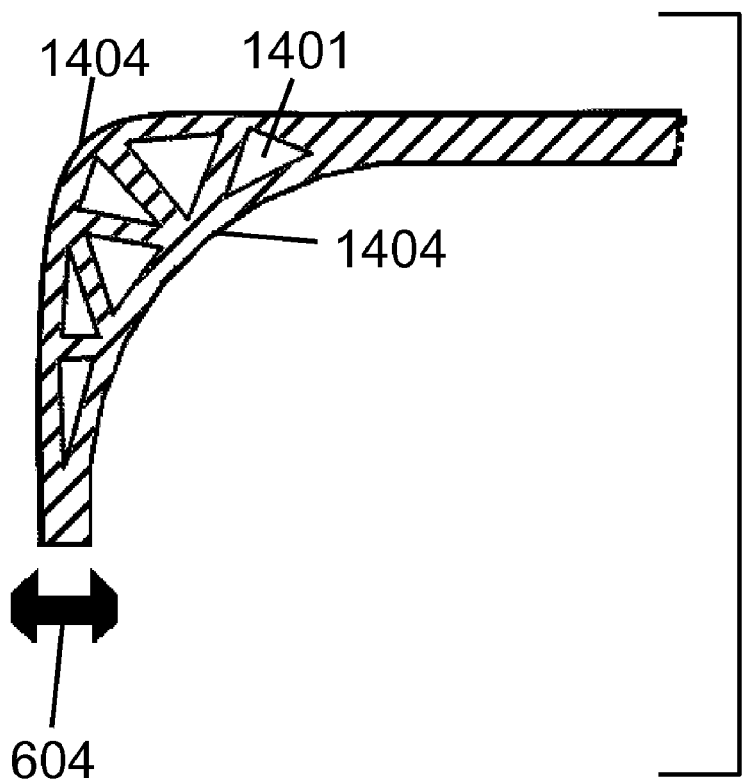
FIG. 14 is a partial rear sectional view of a cargo container, where a plurality of structural gaps are in a top U-shaped panel.

FIG. 14 illustrates a partial sectional rear view of a U-shaped panel and connector. Structural gaps 1402 are included in the U-shaped panel. The structural gaps may include pitched truss, parallel chord truss, truncated truss, and Vierendeel truss formations. The structural gaps reduce the weight of the U-shaped panel which can decrease the cost of transporting a cargo container made from U-shaped panels. The structural gaps 1402 may be formed during the manufacture process, added after the manufacture process by the removal of material, or added after the manufacture process by adding material to the U-shaped panel. Additionally, the curvature of the outer edge of the panel 1404 is not the same as the curvature of the inner edge of the panel 1406. Increased panel thickness at locations of curvature can increase the structural integrity of the cargo container without an increase in the height and/or width. Although there are structural gaps in the U-shaped panel, the structural network/lattice of resin and fibers extends uninterrupted from the horizontal section of the panel, through the curved section of the panel, to the vertical sidewall of the U-shaped panel. Despite structural gaps, a continuous unbroken path of fiber impregnated resin extends from the horizontal section to the vertical sidewall.

Figure 15:
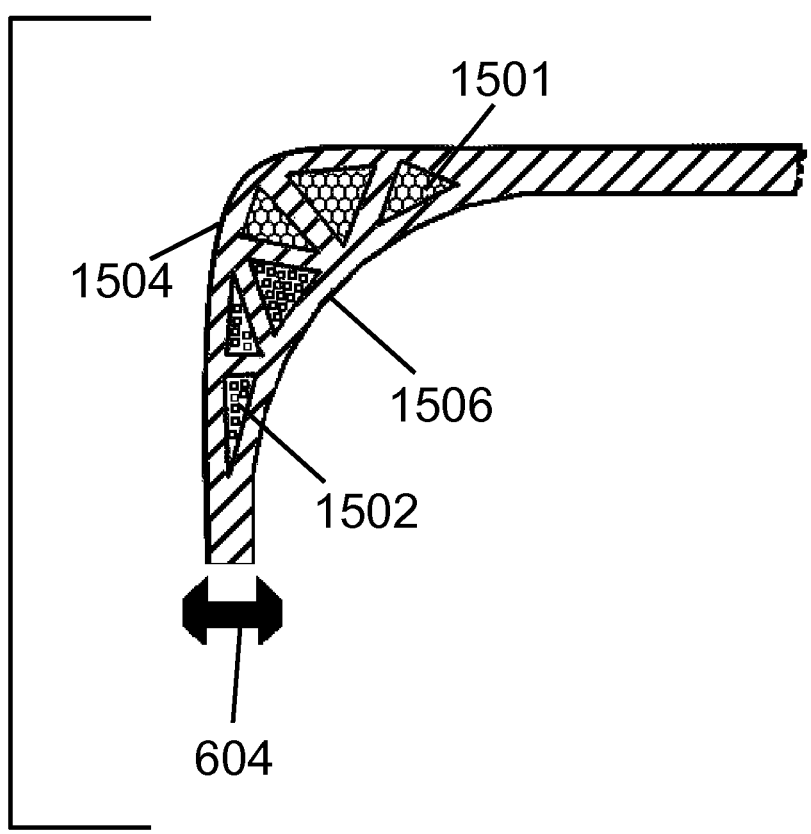
FIG. 15 is a partial rear sectional view of a cargo container, where a plurality of honeycomb and rod-like structural supports are in the structural gaps of a U-shaped panel.

FIG. 15, indicated generally at 1500 illustrates a partial sectional rear view of a U-shaped panel and connector. Weight reducing structural gaps 1502 included in the U-shaped panel. The structural gaps may include pitched truss, parallel chord truss, truncated truss, and Vierendeel truss formations. The structural gaps 1502 may be formed during the manufacture process, added after the manufacture process by the removal or addition of material. Additionally, the curvature of the outer edge of the panel 1504 is not the same as the curvature of the inner edge of the panel 1506. Increased panel thickness at the curved portions can increase the structural integrity of a cargo container made from panels without an increase in the height and or width of the container. Rod shaped 1502 and honeycomb shaped 1504 support materials are included in the weight reducing structural gaps.

Figure 16:
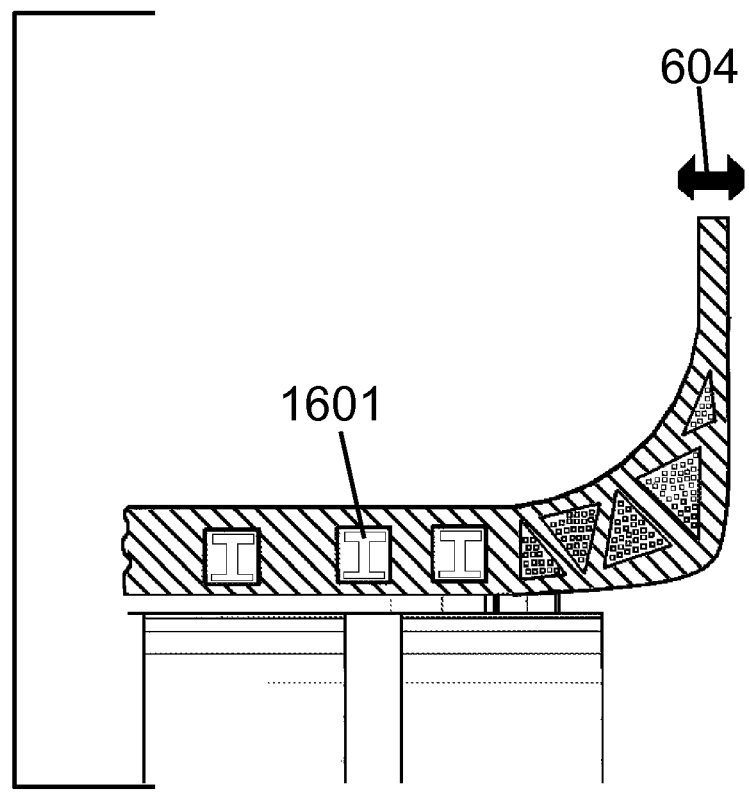
FIG. 16 is a partial rear sectional view of a cargo container, where a plurality of I-beam and rod-like structural supports are in the structural gaps of a U-shaped panel.

FIG. 16 illustrates a partial sectional rear view of a bottom U-shaped panel. Rod shaped and I-beam shaped 1601 support materials are included in the weight reducing structural gaps. In FIG. 16, substantially all of the resin impregnated fibers are oriented parallel to each other and extend perpendicular to the plane of the image.

Figure 17:
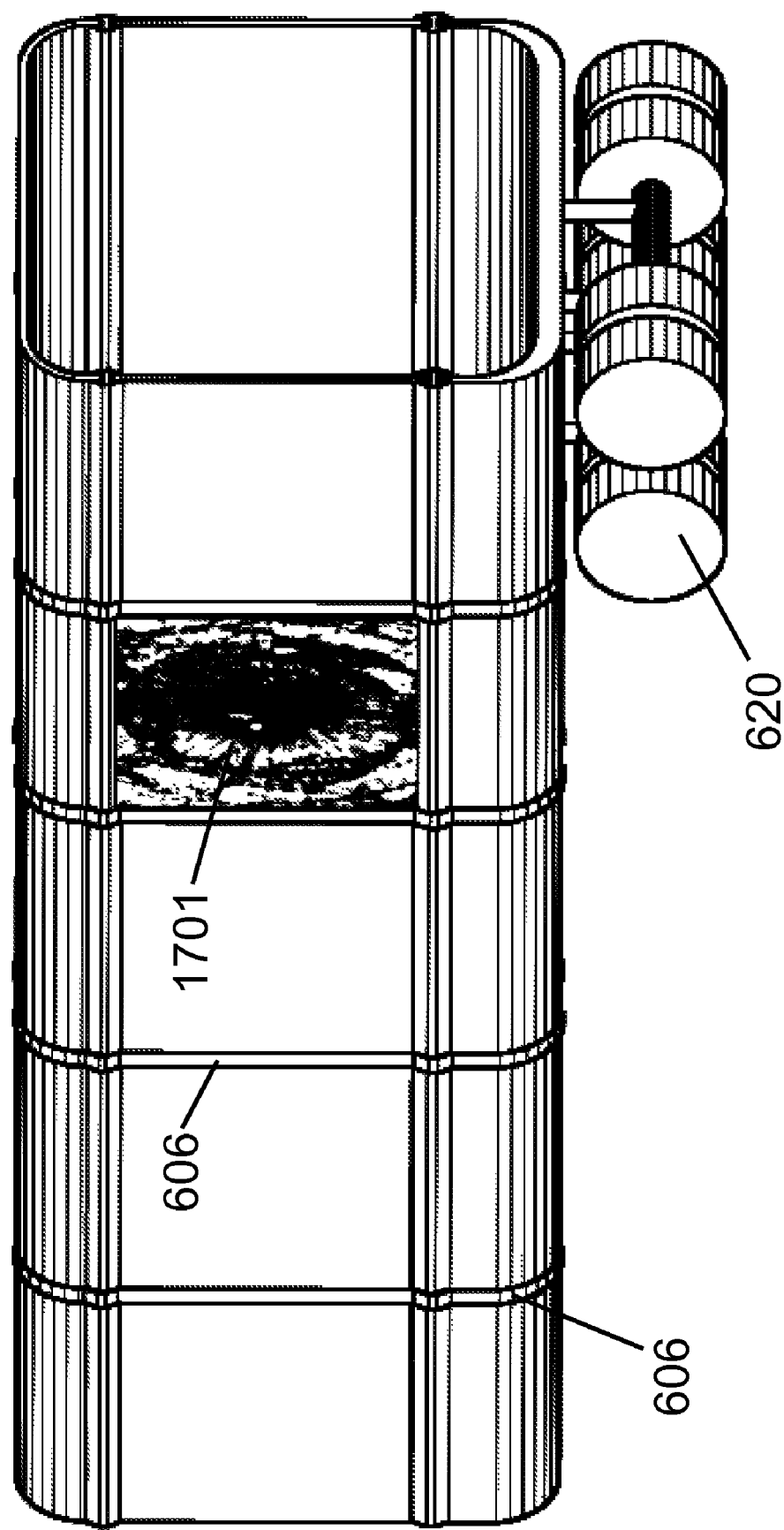
FIG. 17 is a rear perspective view of a cargo container with that includes a plurality of flat side panels, top U-shaped panels, and bottom U-shaped panels, where a single panel has been damaged.

FIG. 17 illustrates a rear perspective view of a cargo container that has been impacted in a vehicle collision. As a result of the vertical connectors 606, and horizontal connectors, the force of the impact was confined to a single panel 1701, thus causing greater trauma to a single panel while preventing damage to the other panels. The damaged panel can be replaced without having to replace a significant amount of undamaged material.

Figure 18:
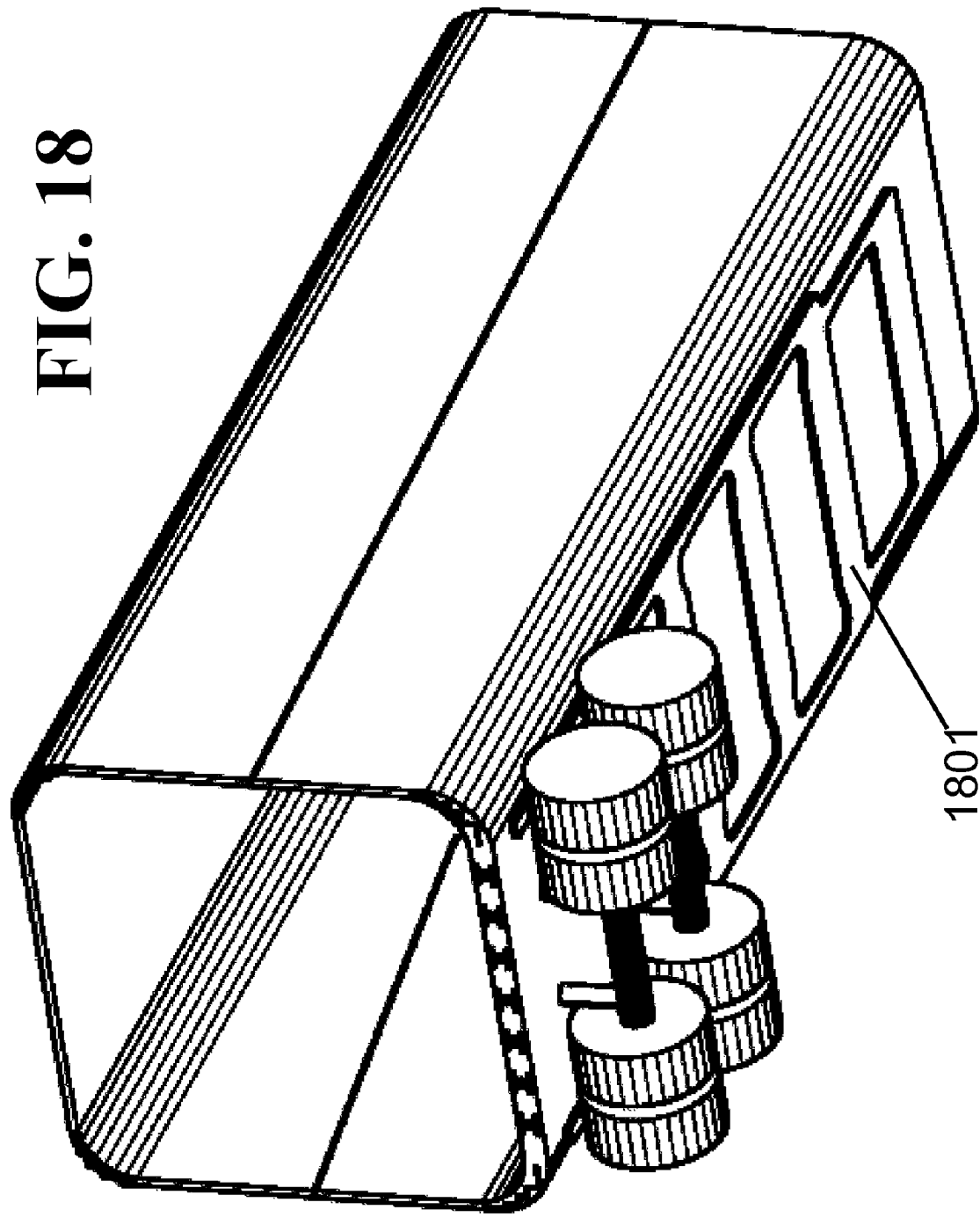
FIG. 18 is a bottom perspective view of a trailer made from U-shaped panels where a non-integral structural support is connected to the floor of the trailer.

FIG. 18 illustrates a bottom perspective view of a cargo container with a non-integral structural support 1801 connected to a cargo container by an attachment means such as rivets, adhesives, nails, screws, welds, or bolts. The structural support is partially located between the wheel assembly and the bottom U-shaped panel. In one embodiment of the invention the structural support extends from about the wheel assembly to about the landing gear assembly (not shown).

Figure 19:
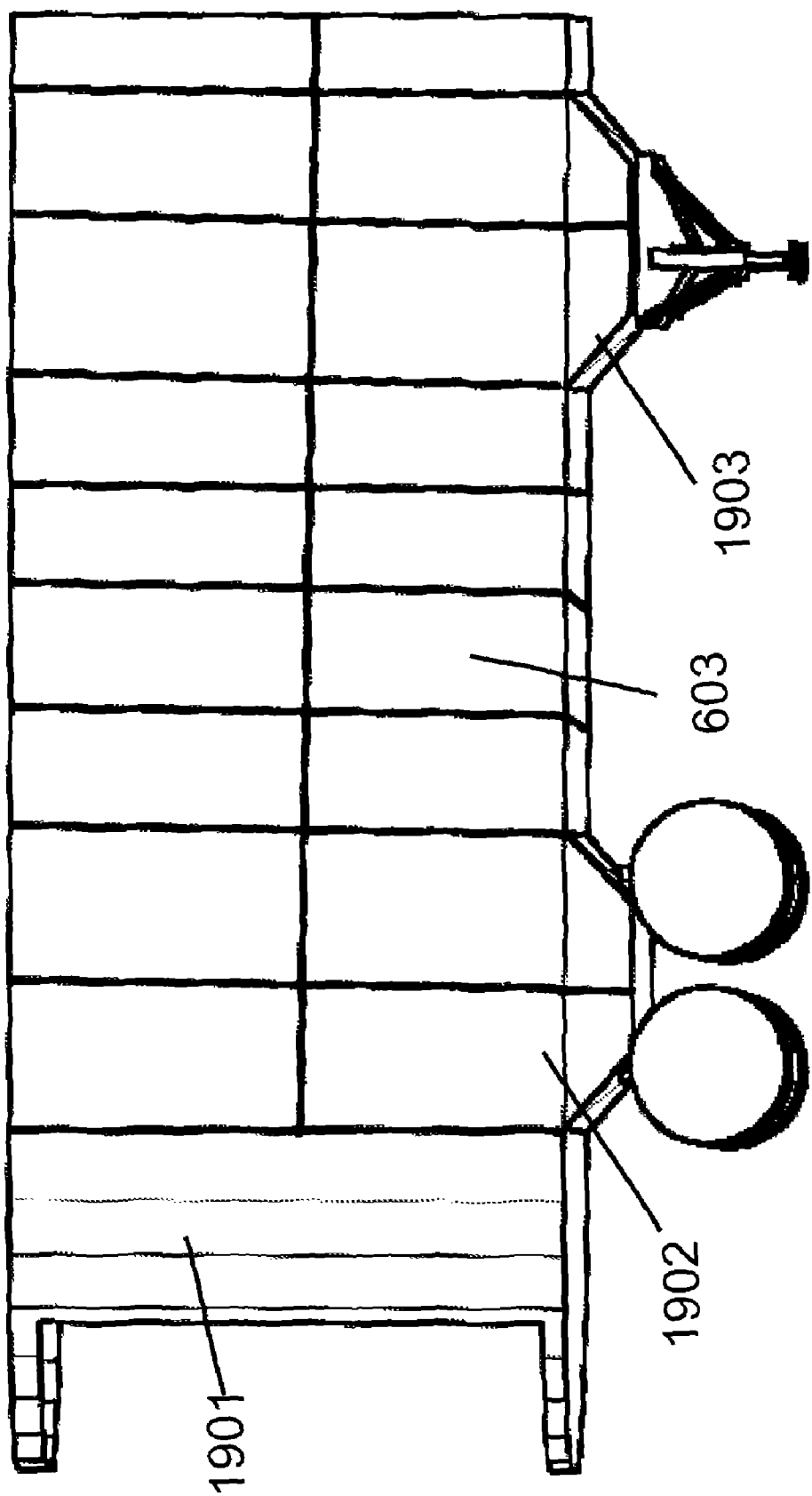
FIG. 19 is a side view of a trailer made from U-shaped panels, where panels of increased thickness connect to the trailer landing gear and wheel assembly.

FIG. 19 illustrates a side perspective view of a cargo container with a rounded rear end 1901. The U-shaped panels of the cargo container connecting to the wheel assembly and landing gear (1902 and 1903) have non-uniform thicknesses. The increased floor thickness at those locations help to dissipate the force exerted on the cargo container by the landing gear and wheel assembly. Between the landing gear and wheel assembly the floor thickness may be substantially less as shown in FIG. 19. The regions of increased floor thickness may be created during a pultrusion process by utilizing a variable cross section method, or by fastening additional material to the cargo container post manufacture.

Figure 20:
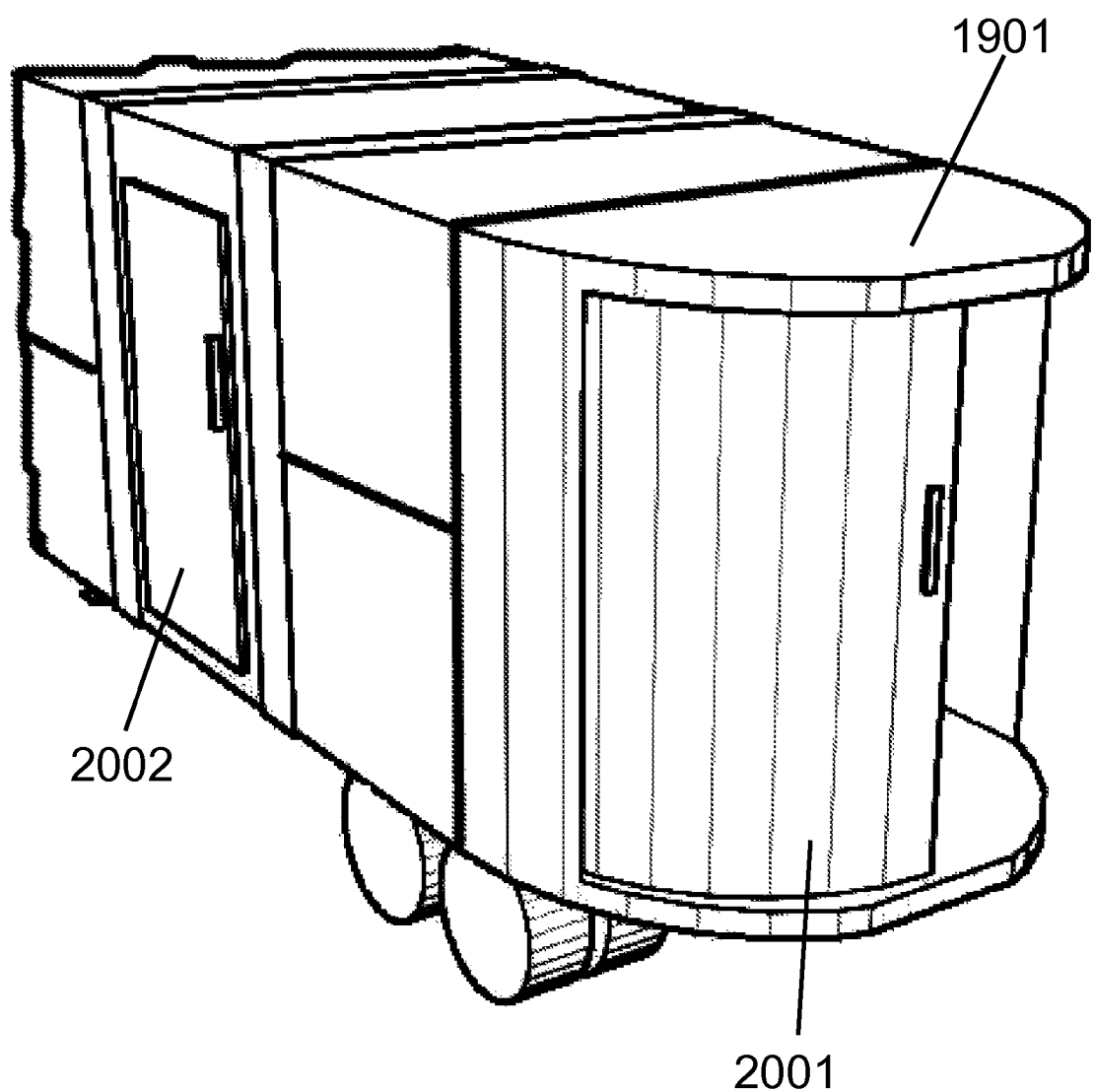
FIG. 20 is a rear perspective view of a cargo container made from U-shaped panels, where the trailer has a side door and a rounded rear section that also has a door.

FIG. 20 illustrates a partial rear perspective view of a cargo container, made from U-shaped panels, that has a rounded rear section 1901, a sliding rear door 2001, and a second door 2002 between the front and read of the cargo container. In another embodiment of the invention, both sides of the cargo container have sliding doors. The additional doors allow for faster loading and unloading of the cargo container, especially when only a portion of the container contents are unloaded.

Figure 21:
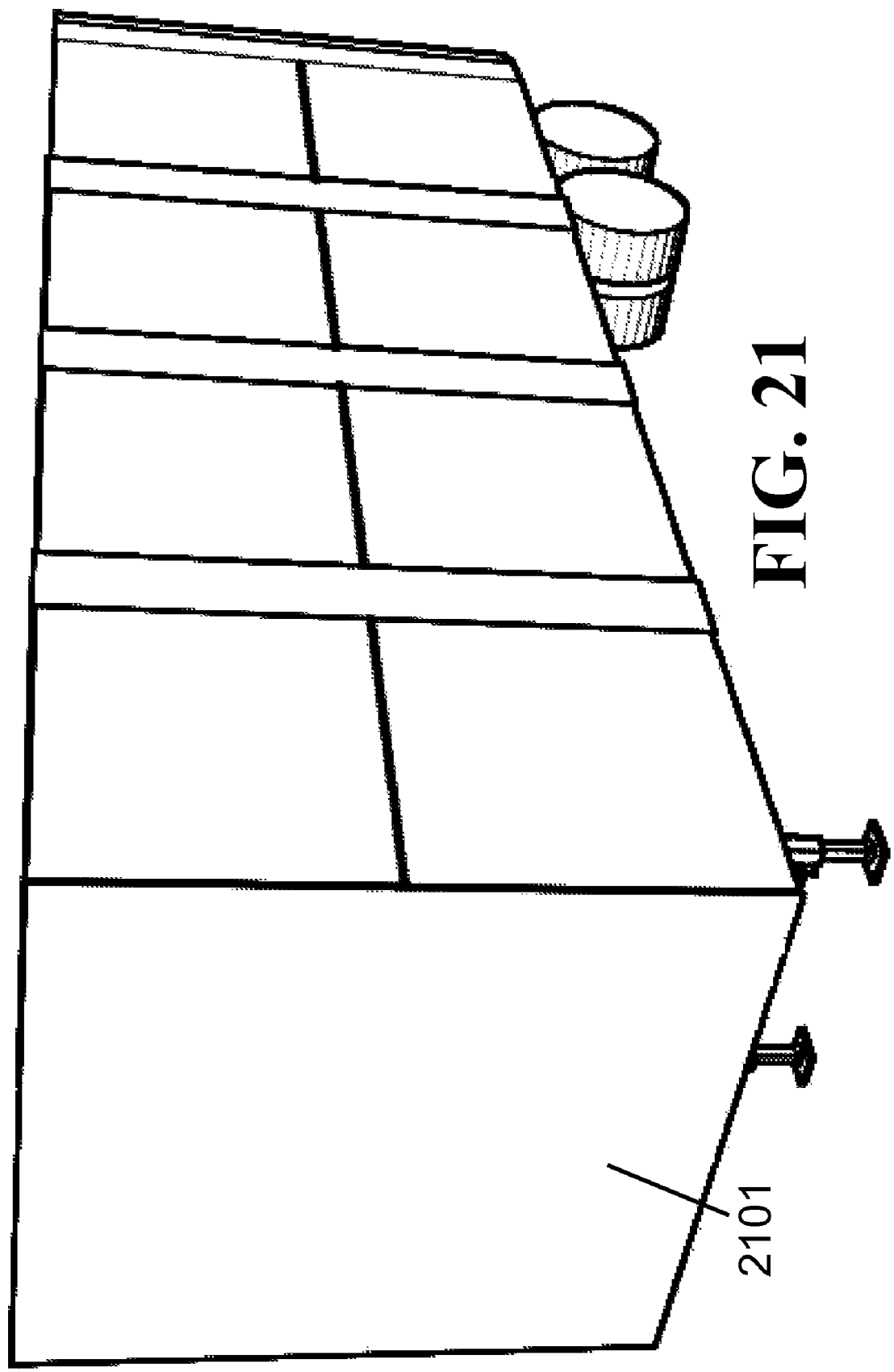
FIG. 21 is a front perspective view of a cargo container made from U-shaped panels that has a flat front section.

FIG. 21 illustrates a front perspective view of a cargo container made with U-shaped panels that include a flat front face 2101 connected to one end of the cargo container. In other embodiments of the invention, the front face is tapered or rounded.

Figure 22:
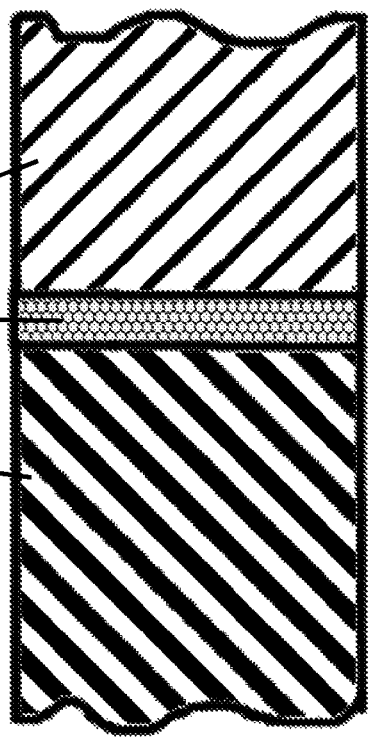
FIG. 22 is a partial sectional view of two panels connected at a flat joint by an adhesive.
Figure 23:
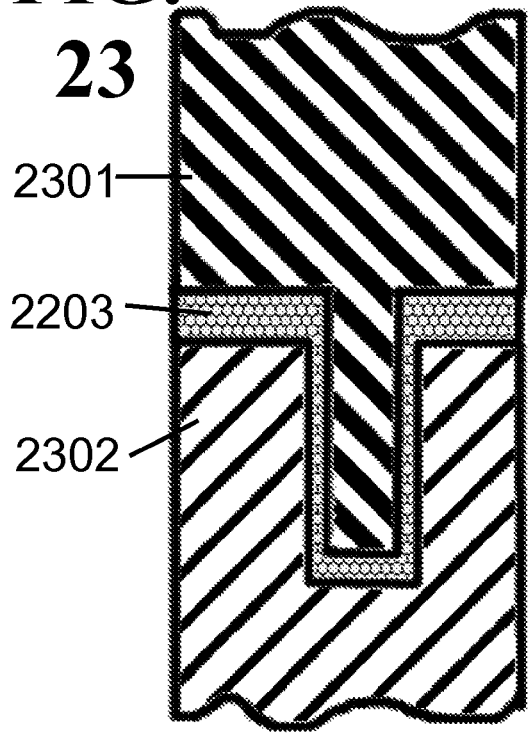
FIG. 23 is a partial sectional view of two panels connected at a T-joint by an adhesive.

FIGS. 22-27 illustrate various embodiments of panel joints. FIG. 22 shows a first and second panel (2201 and 2202), each with a flat surface bonded together by an adhesive 2203. The thickness of the adhesive layer has been greatly exaggerated for clarity. The design illustrated in FIG. 22 has the advantage of simplicity, but lacks bonding strength due to the minimal panel surface area contacting the adhesive. FIG. 23 illustrates a panel with a protrusion 2301 that fits into a panel with a gap 2302. The two panels are further bonded by an adhesive. Such a connection increases the surface area of the panels contacting the adhesive 2203 which results in the bonding strength of the joint shown in FIG. 23 being greater than the joint shown in FIG. 22.

Figure 24:
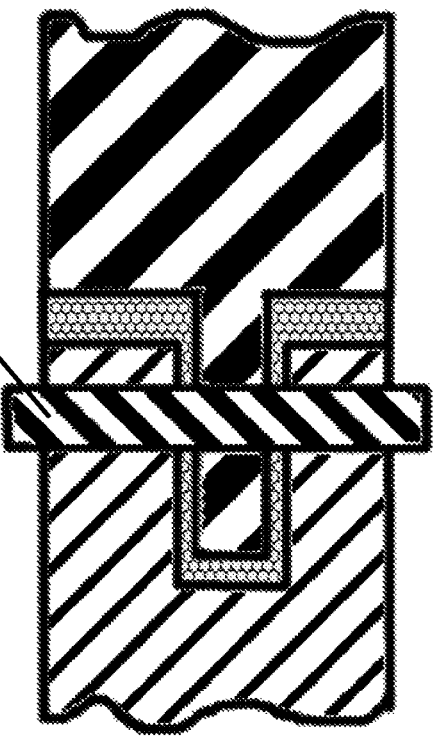
FIG. 24 is a partial sectional view of two panels connected at a T-joint by a cross bolt and an adhesive.
Figure 27:
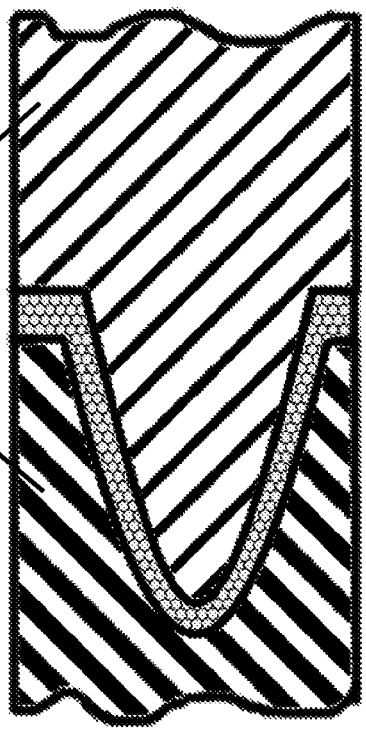
FIG. 27 is a partial sectional view of a panel with a convex section connected to a panel with a concave section by an adhesive.

FIG. 24 shows a connection similar to FIG. 23, with the addition of a bolt 2401 securing both panels. The addition of a bolt may increase the strength of the panel connection; however, a bolt increases the total weight of the cargo container and increases the thickness of the panels. FIG. 25 shows two panels similar to those illustrated in FIG. 22 with the addition of an H-shaped connector 2501 that increases the surface area on to which an adhesive can bond. Like the bolt shown in FIG. 24, the H-shaped connector of FIG. 25 increases the total width of the side of the cargo container. The routed panels 2601 shown in FIG. 26 have edges routed so that the outer sides of the H-shaped connector are substantially flush with the sides of the panels. FIG. 27 illustrates another panel joint between a panel with a convex section 2701 and a panel with a concave section 2702. The use of convex and concave sections allows for a large contact area between panels like the connection shown in FIG. 23, while allowing for a slight rotation of the panels which may assist in the fabrication of the cargo container and absorb small impacts on the cargo container.

Examples of adhesives for bonding panels together include, but are not limited to unplasticized polyvinylchloride (PVC), polyethylene oxide, copolymers of ethylene and acrylic acid (EAA), acrylic materials, rubber base cement, an epoxy based system, and a urethane based system. DP 420™ and SA 8053™ (available from Minnesota Mining and Manufacturing Corporation of St. Paul, Minn.) may also be used as adhesives.

It should be understood that the programs, processes, methods and systems described herein are not related or limited to any particular type components or materials unless indicated otherwise. Various combinations of general purpose, specialized or equivalent components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, any object described may comprise other materials not recited, and the steps of the flow diagrams may be taken in sequences other than those described, and more, fewer or equivalent elements may be used in the block diagrams.

I claim:

1. A method for creating an over the road trailer, the method comprising:
   a) pultruding a top U-shaped panel and a bottom U-shaped panel;
   b) connecting the top U-shaped panel to the bottom U-shaped panel to define an interior space adapted for storing cargo;
   c) connecting a wheel assembly to the bottom U-shaped panel; and
   d) connecting a landing gear assembly to the bottom U-shaped panel.

2. The method of claim 1 further comprising the step of
   e) connecting a door to the both the bottom U-shaped panel and the top U-shaped panel, the height of the door substantially similar to the height of the interior space.

3. The method of claim 1 wherein each of the U-shaped panels includes
   a substantially horizontal structure having a width substantially similar to the width of the wheel assembly,
   a first and second vertical sidewall separated by a distance substantially similar to the width of the wheel assembly,
   a lattice of resin impregnated fibers extending uninterrupted from the first vertical sidewall, through the horizontal structure to the second vertical sidewall.

4. The method of claim 3 wherein
   the horizontal structure of the top U-shaped panel has first portion with a first thickness,
   the horizontal structure of the bottom U-shaped panel has second portion with a second thickness, and
   the first thickness is substantially less than the second thickness.

5. The method of claim 4 wherein
   the horizontal structure of the bottom U-shaped panel has
      a third portion with a third thickness located proximal to the wheel assembly, and
      a fourth portion with a fourth thickness located proximal to the landing gear assembly;
   wherein the second portion located directly between the third and fourth portions;
   the first portion of the top U-shaped panel located directly above the second portion;
   and both the third and fourth thicknesses are substantially greater than both the first and second thicknesses.

6. The method of claim 3 wherein
the first and second vertical sidewalls of the top U-shaped panel have a first height,
the first and second vertical sidewalls of the bottom U-shaped panel have a second height, the first height being substantially equal to the second height, and
the first sidewall of the top U-shaped panel is adjacent to the first sidewall of the bottom U-shaped panel.

7. The method of claim 1 wherein
each of the U-shaped panels includes a lattice of parallelly pultruded resin impregnated fibers.

8. The method of claim 1 wherein
the top U-shaped panel includes
a horizontal structure, and
a first vertical sidewall separated from a second vertical sidewall by the horizontal structure;
the method further comprising the step of
e) connecting a door to the both the bottom U-shaped panel and the top U-shaped panel, the height of the door substantially similar to the height of the interior space, wherein the first and second vertical sidewalls of the top U-shaped panel have a height substantially similar to the height of the door.

9. The method of claim 1 wherein
the bottom U-shaped panel is connected to the top U-shaped panel via a vertically oriented flat sidewall panel.

10. The method of claim 1 further comprising the step of
e) connecting a structural support to the bottom U-shaped panel, the structural support extending from about the wheel assembly to about the landing gear assembly.

11. The method of claim 1 wherein
the top and bottom U-shaped panels are both symmetrical about a geometric plane, the geometric plane including
a portion of the wheel assembly,
a portion of the landing gear assembly, and
a portion of a kingpin connecting to the bottom U-shaped panel.

12. The method of claim 1 wherein
the pultruding step includes
pulling first a lattice of parallel resin impregnated fibers through a heated die, and
cutting the first lattice perpendicularly to the parallel resin impregnated fibers to form the top U-shaped panel.

13. The method of claim 12 wherein
the pultruding step further includes
pulling a second lattice of parallel resin impregnated fibers through the heated die, and
cutting the second lattice perpendicularly to the parallel resin impregnated fibers to form the bottom U-shaped panel; and
the connecting the top U-shaped panel to the bottom U-shaped panel step includes the fibers of the first lattice are parallel to the fibers of the second lattice.

14. The method of claim 1 wherein
the pultruding step includes
drawing a U-shaped material through a heated die in a first direction,
forming a structural void within the U-shaped material, and
cutting the U-shaped material perpendicular to the first direction to form the top U-shaped panel.

15. The method of claim 14 wherein
the structural void extends through the U-shaped material in the first direction.

16. The method of claim 14 wherein
the pultruding step further includes
inserting a structural support into the structural void.

17. The method of claim 16 wherein
the structural support is selected from a group consisting of an I-beam and a honeycomb lattice.

18. The method of claim 1 wherein
the pultruding step includes
drawing a U-shaped material through a die in a first direction,
cutting the U-shaped material perpendicular to the first direction to form the top U-shaped panel; and
the U-shaped material includes a plurality of parallel resin impregnated fibers.

19. The method of claim 1 wherein
the pultruding step includes
pulling a first resin-impregnated fibrous material through a first die in a first direction,
cutting the first resin-impregnated fibrous material perpendicular to the first direction to form the top U-shaped panel,
pulling a second resin-impregnated fibrous material through a second die in a second direction, and
cutting the second resin-impregnated fibrous material perpendicular to the second direction to form the bottom U-shaped panel.

20. The method of claim 1 wherein
the pultruding step includes
continuously pulling a first resin-impregnated fibrous material through a first die in a first direction,
cutting the first resin-impregnated fibrous material perpendicular to the first direction to form the bottom U-shaped panel, and
cutting the first resin-impregnated fibrous material perpendicular to the first direction to form a additional lower U-shaped panel.

21. The method of claim 20 wherein
the connecting the wheel assembly to the bottom U-shaped panel step includes
securing a first wheel axel to the bottom U-shaped panel, and
securing a second wheel axel to the additional lower U-shaped panel.

* * * * *